(12) United States Patent
Engelhardt et al.

(10) Patent No.: US 6,510,001 B1
(45) Date of Patent: Jan. 21, 2003

(54) OPTICAL ARRANGEMENT WITH A SPECTRALLY SELECTIVE ELEMENT

(75) Inventors: Johann Engelhardt, Bad Schönborn (DE); Joachim Bradl, Schriesheim (DE); Heinrich Ulrich, Heidelberg (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/622,489

(22) PCT Filed: Feb. 19, 1999

(86) PCT No.: PCT/DE99/00459
§ 371 (c)(1),
(2), (4) Date: Aug. 17, 2000

(87) PCT Pub. No.: WO99/42884
PCT Pub. Date: Aug. 26, 1999

(30) Foreign Application Priority Data

Feb. 19, 1998 (DE) .......................... 198 06 867

(51) Int. Cl.⁷ .............................................. G02B 21/06
(52) U.S. Cl. ....................... 359/385; 359/386; 359/388
(58) Field of Search ................................ 359/385, 386, 359/387, 388, 223, 368; 250/234, 235, 213 VT, 310, 397, 216, 461

(56) References Cited

U.S. PATENT DOCUMENTS

| | | | |
|---|---|---|---|
| 4,827,125 A | * 5/1989 | Goldstein | 250/216 |
| 5,410,371 A | 4/1995 | Lambert | 348/769 |
| 5,418,371 A | 5/1995 | Aslund et al. | 250/458.1 |
| 5,535,293 A | * 7/1996 | Buchin | 250/227.21 |
| 5,672,880 A | 9/1997 | Kain | 250/458.1 |
| 6,433,929 B1 | * 8/2002 | Sasaki | 250/461.1 |

FOREIGN PATENT DOCUMENTS

| | | |
|---|---|---|
| DE | 43 30 347 A1 | 3/1995 |
| DE | 196 27 568 A | 1/1998 |
| EP | 0 732 582 A | 9/1996 |
| WO | WO 88 08550 A | 11/1988 |
| WO | WO 92 01966 A | 2/1992 |
| WO | WO 92 18850 A | 10/1992 |

* cited by examiner

Primary Examiner—Mohammad Sikder
(74) Attorney, Agent, or Firm—Simpson & Simpson, PLLC

(57) ABSTRACT

An optical arrangement in the beam path of a light source suitable for fluorescence excitation, preferably in the beam path of a confocal laser scanning microscope, with at least one spectrally selective element (4) to inject the excitation light (3) of at least one light source (2) in the microscope and to extract the excitation light (3) scattered and reflected on the object or the excitation wavelength from the light (13) coming from the object (10) through the detection beam path(12) is characterized for variable configuration with the simplest construction in that excitation light (3, 9) of different wavelengths can be extracted by the spectrally selective element (4). Alternatively, an optical arrangement like this is characterized in that the spectrally selective element (4) can be adjusted to the excitation wavelength to be extracted.

48 Claims, 8 Drawing Sheets

OPTICAL ARRANGEMENT WITH A SPECTRALLY SELECTIVE ELEMENT

Figure 1:
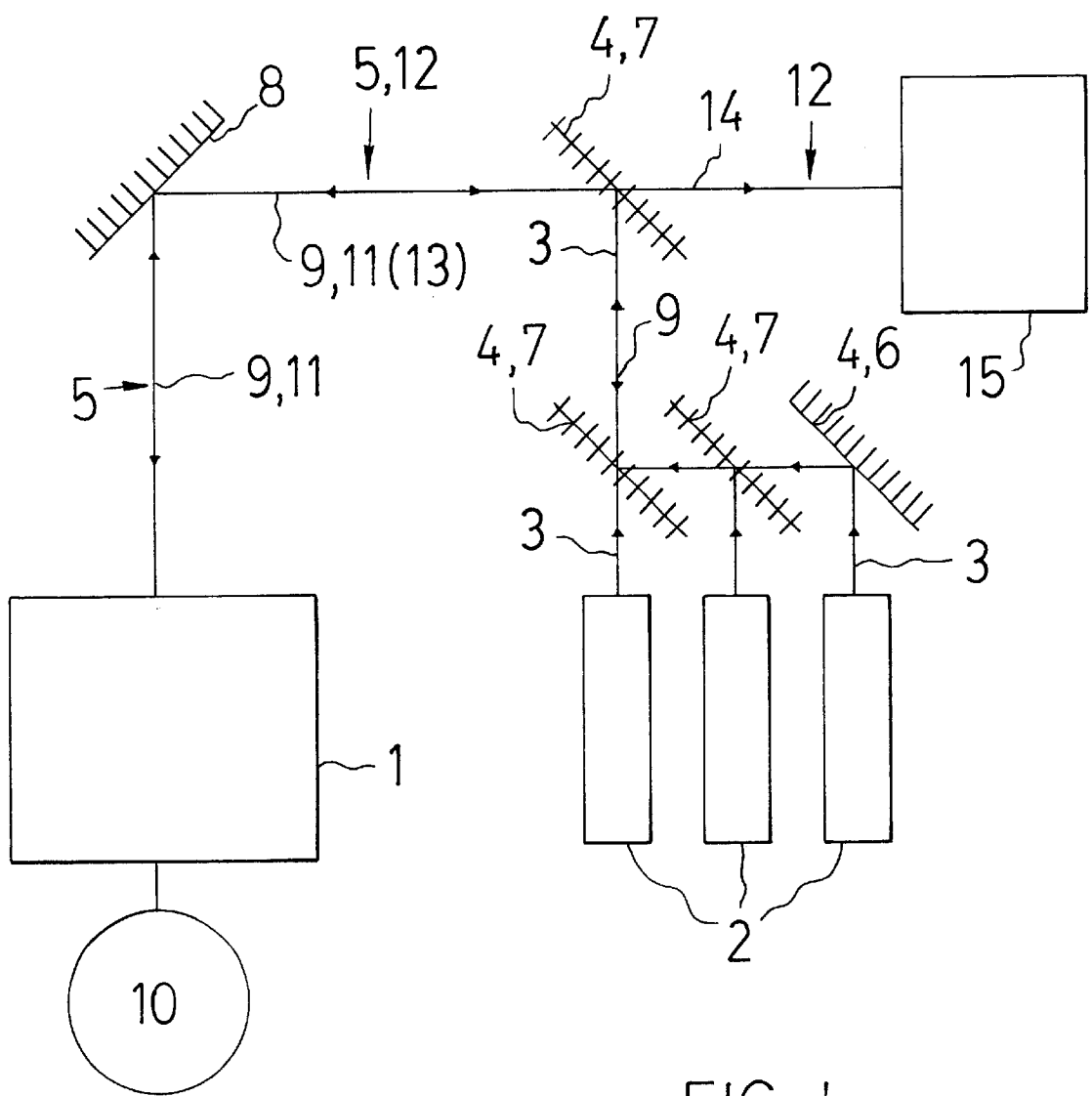

The invention relates to an optical arrangement in the beam path of a light source suitable for fluorescence excitation, preferably in the beam path of a confocal laser scanning microscope, with at least one spectrally selective element to inject the excitation light of at least one light source in the microscope and to extract the excitation light scattered and reflected on the object or the excitation wavelength from the light coming from the object through the detection beam path.

In both conventional and confocal laser-scanning microscopy, color beam splitters with an entirely specialized transmission and reflection characteristic are used in the beam path of a light source suited for fluorescence excitation. This is predominantly a dichroic beam splitter. With an element like this, the fluorescence excitation wavelength $\lambda_{ill1}$ or $\lambda_{ill2}, \lambda_{ill3} \ldots, \lambda_{illn}$ when several lasers are used) is reflected in the illumination beam path in order to excite the fluorescence distribution in the object and then to pass through the beam path, together with the excitation light dispersed and reflected on the object, up to the color beam splitter. The excitation light with the wavelengths $\lambda_{ill1}, \lambda_{ill2}, \lambda_{ill3}, \ldots, \lambda_{illn}$ is reflected back into the laser at the color beam splitter, specifically out of the detection beam path. The fluorescent light with the wavelengths $\lambda_{fluo1}, \lambda_{fluo2}, \lambda_{fluo3}, \ldots, \lambda_{fluon}$ passes the color beam splitter and is detected in some cases after further spectral subdivision.

Color beam splitters are typically realized by means of an interference filter and are purposively attenuated for excitation or for detection, depending on the wavelengths used. At this point it should be noted that according to the preceding description of the prior art, a wavelength-separable element that splits the light of various wavelengths on the basis of wavelength and not on the basis of polarization is understood as falling under the concept of a dichroit.

In practice the use of color beam splitters is disadvantageous to begin with in that it involves optical components that are very complex, therefore very expensive, in terms of production. It is also disadvantageous that color beam splitters have a fixed wavelength characteristic and therefore cannot be used with flexibility in terms of the wavelength of the excitation light. If the wavelength of the excitation light is changed, the color beam splitters must also be replaced, for example in an arrangement of several color beam splitters in a filter wheel. However, this is complex and therefore costly, requiring an entirely specialized adjustment of the individual color beam splitters.

The use of a color beam splitter is encumbered with the further disadvantage that certain light losses occur due to reflection, in particular light losses of fluorescent light, which is exactly what is to be detected. The spectral transmission/reflection range is rather wide for color beam splitters $\lambda_{ill,} \pm 20$ nm) and in no way is ideally "steep". Consequently, the fluorescent light from this spectral range cannot be ideally detected.

If color beam splitters are used, the number of lasers that can simultaneously inject is limited, specifically, for example, to the number of color beam splitters which are arranged in and which can be combined for a filter wheel. Typically, a maximum of three lasers is injected into the beam path. As previously explained, all color beam splitters, thus also the color beam splitters arranged in a filter wheel, must be adjusted precisely, thereby involving a substantial amount of manipulation. Alternatively, one can use suitable neutral beam splitters, which efficiently route the fluorescent light together with the excitation light scattered/reflected on the object. The losses for the laser injection here are nonetheless considerable.

For documentation of the prior art, merely refer to DE 196 27 568 A1 as an example, which shows an optical arrangement for confocal microscopy. Therefore, in concrete terms this is an arrangement for the simultaneous confocal lighting of an object plane with a multiplicity of suitable divergent light points along with accompanying imaging components and a multiplicity of pinholes for confocal contrast-rich imaging in an observation device, which can be a microscope. The injection of several light sources is made there by means of a diffractive element. Several optical splitter elements or color beam splitters are arranged in the detection beam path, resulting in a very substantial amount of added technical complexity.

As far as using active optic elements in the beam path of a laser scanning microscope is concerned, refer also to U.S. Pat. No. 4,827,125 and U.S. Pat. No. 5,410,371, said documents showing the basic use of an AOD (Acousto-Optical Deflector) and an AOTF (Acousto-Optical Tunable Filter), and specifically always with the purpose of deflecting or reducing a beam.

The object of the invention is to design and develop an optical arrangement in the beam path of a light source suitable for fluorescence excitation such that the injection of the excitation light of various excitation wavelengths is possible without having to switch or make special adjustments to the optical elements used when switching the wavelength of the excitation light. Furthermore, the number of optical elements required is to be reduced as much as possible. Finally, an ideal detection of the fluorescence light should be possible.

The inventive optical arrangement in the beam path of a light source suitable for fluorescence excitation, preferably in the beam path of a confocal laser scanning microscope, fulfills the object of the invention by means of the features of the coordinated patent claims 1 and 2. These claims describe an optical arrangement of the type in question that is characterized in that by using the spectrally selective element, excitation light of different wavelengths can be extracted or injected accordingly. Alternatively, the optical arrangement is characterized in that the spectrally selective element can be adjusted to the excitation wavelengths to be extracted.

It is recognized according to the invention that the color beam splitter previously used in the beam path of a light source suitable for fluorescence excitation, especially in the beam path of a confocal laser scanning microscope, can be replaced by a very unique spectrally selective element, specifically by a spectrally selective element that is suitable for extracting or inserting/injecting different wavelengths. This spectrally selective element is used on the one hand to inject the excitation light of at least one light source in the microscope and on the other hand to extract the excitation light scattered and reflected on the object, or the corresponding wavelengths from the light coming from the object through the detection beam path. In this respect the spectrally selective element serves a double function, both of these functions being almost mandatorily linked.

As an alternative to the capability of the spectrally selective element to extract excitation light of different wavelengths, the spectrally selective element can be adjusted to the particular excitation wavelength to be incorporated or extracted. Also in this respect based on the previously described double function, a mandatory linking is guaranteed in a simple way, namely that the excitation light can be injected in the lighting path by using the spectrally selective element and by extracting exactly the wavelength of the excitation light, namely the excitation wavelength from the light coming from the object through the detection beam path based on the adjustability provided here, so that the detection light (=fluorescent light) coming from the object remains for detection.

Advantageously, the spectrally selective element—to favor the previously discussed double function—can be a passive element or component. The spectrally selective element here can be configured as a transparent optical grating or as a holographic element. It is also conceivable to configure the spectrally selective element as a passive AOD (Acousto-Optical Deflector) or as a passive AOTF (Acousto-Optical Tunable Filter).

In an especially advantageous manner, specifically for the concrete realization of the adjustability of the spectrally selective element to the excitation wavelength to be extracted, the spectrally selective element can be an active component, for example an element working on an acousto-optical and/or electro-optical basis. In concrete terms this means an AOD (Acousto-Optical Deflector) or an AOTF (Acousto-Optical Tunable Filter).

Instead of the color beam splitter that is standard for the prior art, here an active spectrally selective element is used, thus for example an AOD or an AOTF. The purpose of this active component consists of injecting the excitation light of the light source or of the laser or lasers $\lambda_{ill1}, \lambda_{ill2}, \lambda_{ill3}, \ldots, \lambda_{illn}$ into the illumination beam path and thus into the microscope in order to then activate by beam scanning the fluorescence distribution in the object. For the detection, the fluorescent light coming from the object can pass the active spectrally selective element nearly undisturbed. In the process the light scattered or reflected by the object having the excitation wavelength of the light source or of the laser or lasers from the detection beam path is largely reflected out.

For the injection of a light source or of a laser or several lasers with different wavelengths $\lambda_{ill1}, \lambda_{ill2}, \ldots, \lambda_{illn}$, an AOD with corresponding frequencies $v_1, v_2, \ldots, v_n$ can be connected, preferably simultaneously, so that the different laser beams, after passing through the AOD run coaxially with the optical axis. Regarding the use of the AOD, it is important that there a frequency $v_n$ selects a wavelength $\lambda_{illn}$ that is deflected out of the actual beam path. The angle of deflection $\phi$ here is defined by the formula $$\phi = \lambda_{illn} v_n / 2f$$

f being the expansion speed of the sound wave in the AOD. The fluorescent light to be detected with a spectral distribution around the wavelengths $\lambda_{fluo1}, \lambda_{fluo2}, \ldots, \lambda_{fluon}$ together with the excitation light scattered or reflected on the object with the wavelengths $\lambda_{ill1}, \lambda_{ill2}, \ldots, \lambda_{illn}$ then passes through the AOD in the reverse direction. Nevertheless, the excitation light with the wavelengths $\lambda_{ill1}, \lambda_{ill2}, \ldots, \lambda_{illn}$ is deflected out of the detection beam path in the direction of the laser according to the reversibility of the light path based of the specific setting of the AOD (1$^{st}$ order). Thus, the "spectrally remnant" fluorescent light around the wavelengths $\lambda_{fluo1}, \lambda_{fluo2}, \ldots, \lambda_{fluon}$ can be detected in an improved way, compared with a standard color beam splitter (0-order). In this way the adjustment of the injection of different lasers can in any event be made more simply than in the prior art (there using standard color beam splitters in a filter wheel).

In an additional advantageous way, connecting additional AOTF's could selectively regulate the individual wavelengths in their power after the merging of the beams.

To insert a laser light source with various wavelengths $\lambda_{fill1}, \lambda_{fill2}, \ldots, \lambda_{filln}$, an AOTF with corresponding frequencies $v_1, v_2, \ldots, v_n$ can be simultaneously connected so that the different wavelengths vary in their excitation power and can be optimized according to application. The supply of laser light can be made using a fiber optical waveguide.

In any case, the light source or laser is coaxially injected from the direction of the 1$^{st}$ order of the crystal. The fluorescent light to be detected with a spectral distribution around the wavelengths $\lambda_{fluo1}, \lambda_{fluo2}, \ldots, \lambda_{fluon}$, together with the excitation light with wavelengths $\lambda_{fill1}, \lambda_{fill2}, \ldots, \lambda_{filn}$ scattered or reflected on the object then pass through the AOTF in the reverse direction. According to the reversibility of the light path, the excitation light with the wavelengths $\lambda_{fill1}, \lambda_{fill2}, \ldots, \lambda_{filn}$, are deflected out of the detection path in the direction of the light source or laser because of the specific setting of the AOTF. Thus, the "spectrally remnant" fluorescent light around the wavelengths $\lambda_{fluo1}, \lambda_{fluo2}, \ldots, \lambda_{fluon}$ can be detected (0-order) in—compared to the standard color beam splitter—an improved way.

Using either an AOD or AOTF or even a transparent grating, the fluorescent light, after passing through the particular active element, will spectrally fan itself out based on the dispersion that occurs. In this respect, it is advantageous to connect one or more corresponding "inverse" elements downstream so that the undesired spectral fanning out is made to go in reverse again. It is also conceivable to connect additional optical elements upstream or downstream from the element in question (AOD, AOTF or transparent grating) for focusing or for extraction of undesired beam portions. The detection beam reunited in this way can then be spectrally dissected and depicted on the different detectors in a conventional manner using downstream color beam splitters.

Fundamentally, an arrangement in the sense of a "multi-band detector" is conceivable. Refer to the patent application DE 43 30 347.1-42, the content of which is expressly consulted here and in this respect is assumed to be known in the art. The excitation pinhole, this being identical to the detection pinhole, is arranged between the scan unit and the AOD, the transparent grating (with several light sources or lasers of several wavelengths) or the AOTF (with one light source or one laser with various wavelengths). In an advantageous way, the characteristic of the crystal here of spectrally fanning out the light beam of the 0-order by means of the prism effect is used for detection. The dispersive element of the multi-band detector is combined here with the color beam splitter into one component so that all additional color beam splitters connected downstream from the detection beam path and encumbered with additional losses in the intensity of the fluorescence are eliminated.

In a very unique way, the previously discussed technique in combination with a variable laser light source that is variable in wave length—e.g. dye laser, OPO (optically parameterized oscillator), electron beam collision light source—can enable exceptionally flexible fluorescence microscopy applications. The setting or control of the excitation wavelength can be coupled directly to the drive unit of one of the previously described spectrally selective elements so that only this excitation wavelength is injected and in turn only this wavelength is extracted from the detection beam path. The coupling or mandatory coupling of the light source to the beam-splitting element can be accomplished either manually or automatically or perhaps according a pre-determinable specification, whereby this possibility must be adapted to the current requirement profile. For example, after each scanned focal plane, the excitation wavelength and the beam splitter can be changed in a suitable way. In this way multi-colored fluorescence objects can be detected. A conversion by lines is also conceivable.

The advantages of the concept according to the invention can be summarized in conjunction with an advantageous embodiment as follows:

The spectrally selective elements are "transparent" for all wavelengths except for the selected excitation wavelengths $\lambda_{ill1}, \lambda_{ill2}, \ldots, \lambda_{illn}$. The "spectral loss" is minimal, since only the selected spectral range of typically $\lambda_{illn} \pm 2$ nm is deflected by the spectrally selective element. As a result, the spectral range for the detection is expanded. As a result almost any of the many different wavelength ranges can be simultaneously injected and used. The spectrally "lost fluorescent intensity" that is caused by the spectrally selective elements is less than for standard color beam splitters. In other words, there are reduced losses in intensity in the range in question. The active spectrally selective elements can be flexibly adjusted so that in principle many light sources or lasers with various wavelengths can also be injected simultaneously into the microscope. This enables the improved application with multi-color FISH (Fluorescence-In-Situ Hybridization). Consequently, there is still only a limitation of the spectral splitting of the fluorescent light, for example, due to "cross-talk". Standard barrier filters can be completely omitted so that additional losses of fluorescent light in the detection are prevented.

Finally, it is also conceivable that another active holographic element be connected downstream from the spectrally selective element and the task of the beam scanner be performed in the process. Both elements can be combined into a single component.

In principle different light sources can be used as long as they are suited for fluorescent excitation. The following come to mind as examples: a white light source, a light source for using an optic parameterized oscillator, an electron beam collision light source or a laser light source, the latter capable of being varied through wavelength variation. Laser light sources with different wavelengths or a light source comprising several lasers can be used.

There are then different possibilities of configuring and developing the present invention in an advantageous way. On this point refer on the one hand to the patent claims subordinate to patent claims 1 and 2, and on the other hand to the following explanation of preferred embodiments with reference to the drawings. In connection with the explanation of the preferred embodiments of the invention with reference to the drawings, generally preferred embodiments and developments of the concept are also explained. Shown in the drawings are:

FIG. 1 in a schematic representation, an optical arrangement of the type in question in the beam path of a confocal laser-scanning microscope for documentation of the prior art upon which the invention is based.

Figure 2:
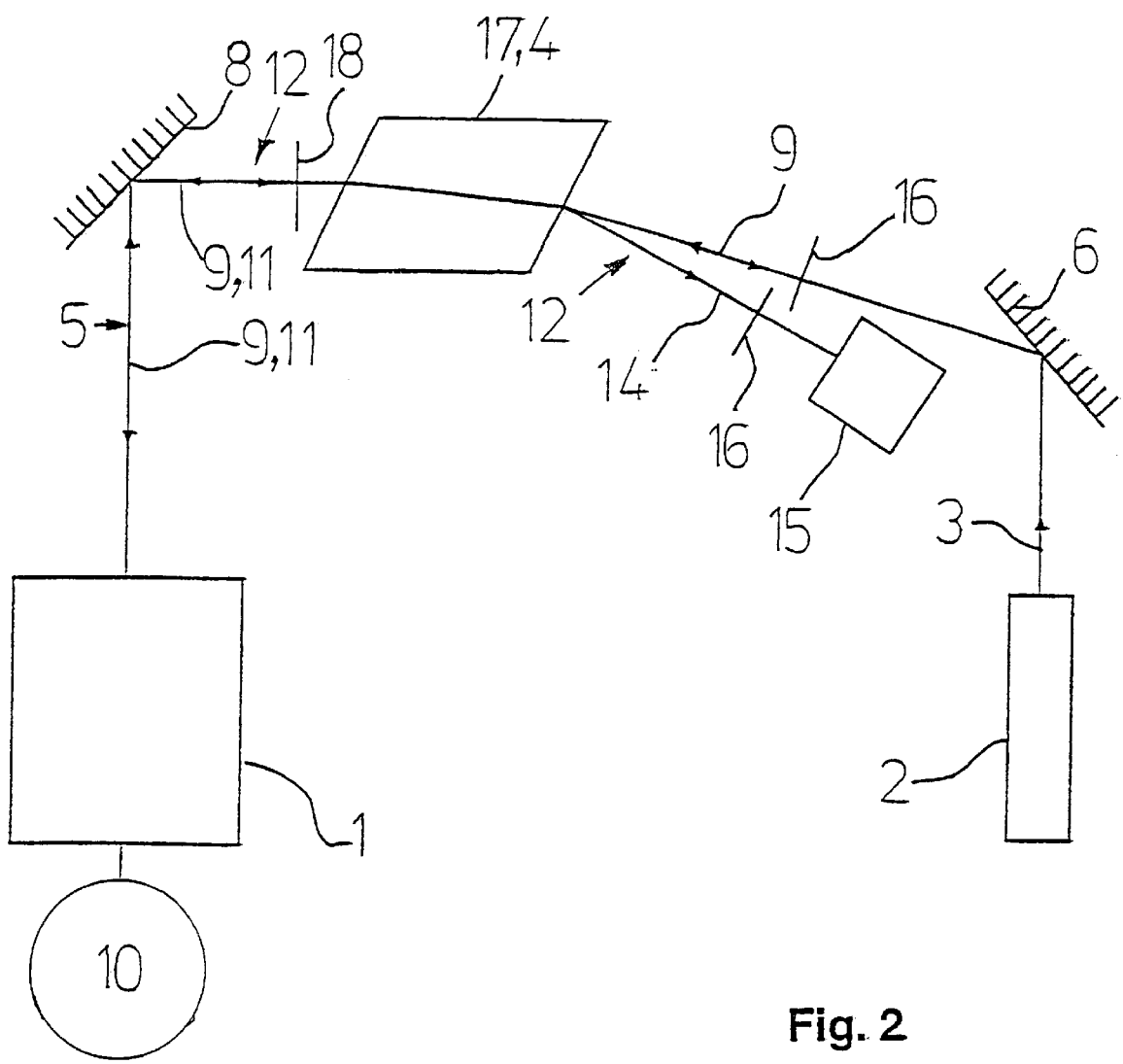
Figure 3:
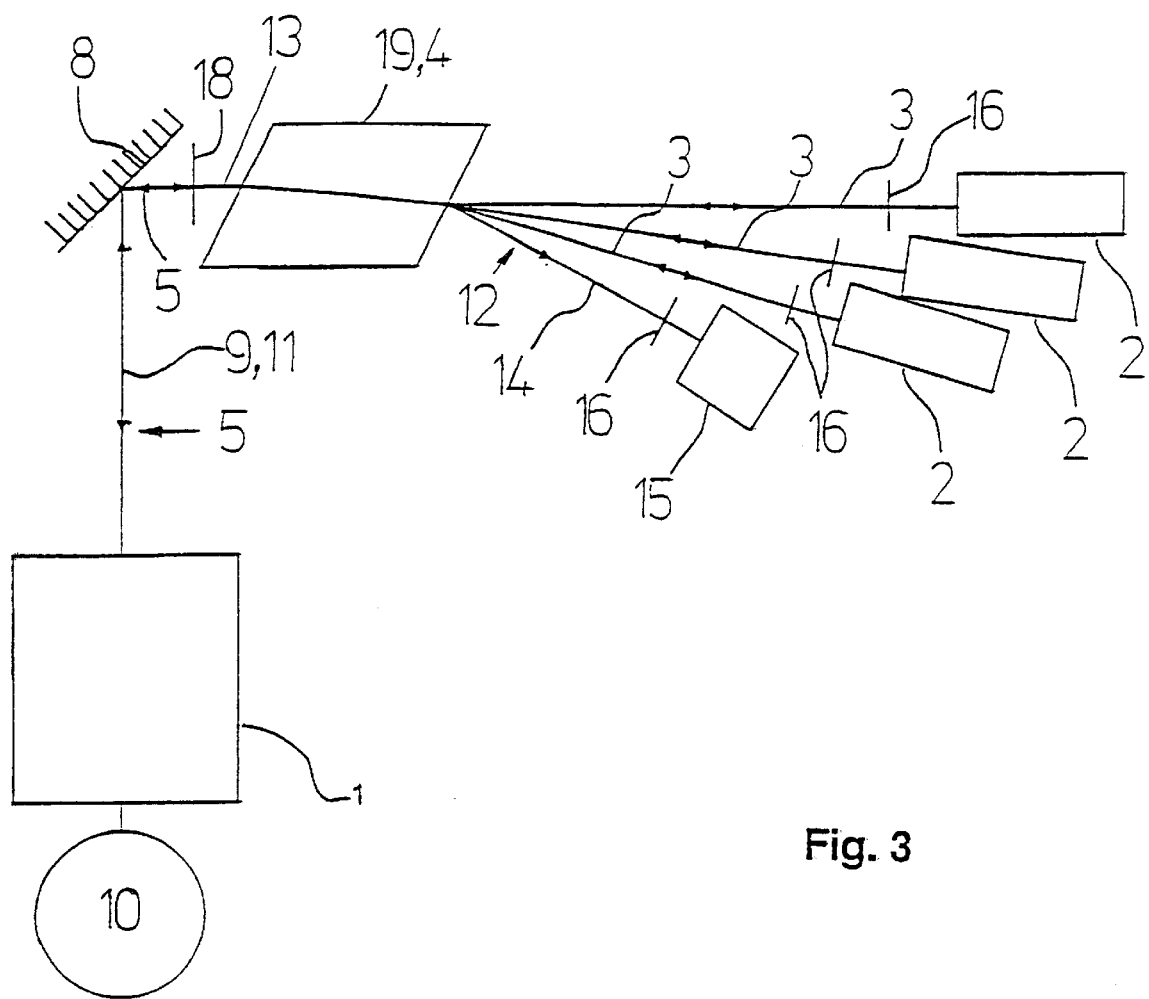
Figure 4:
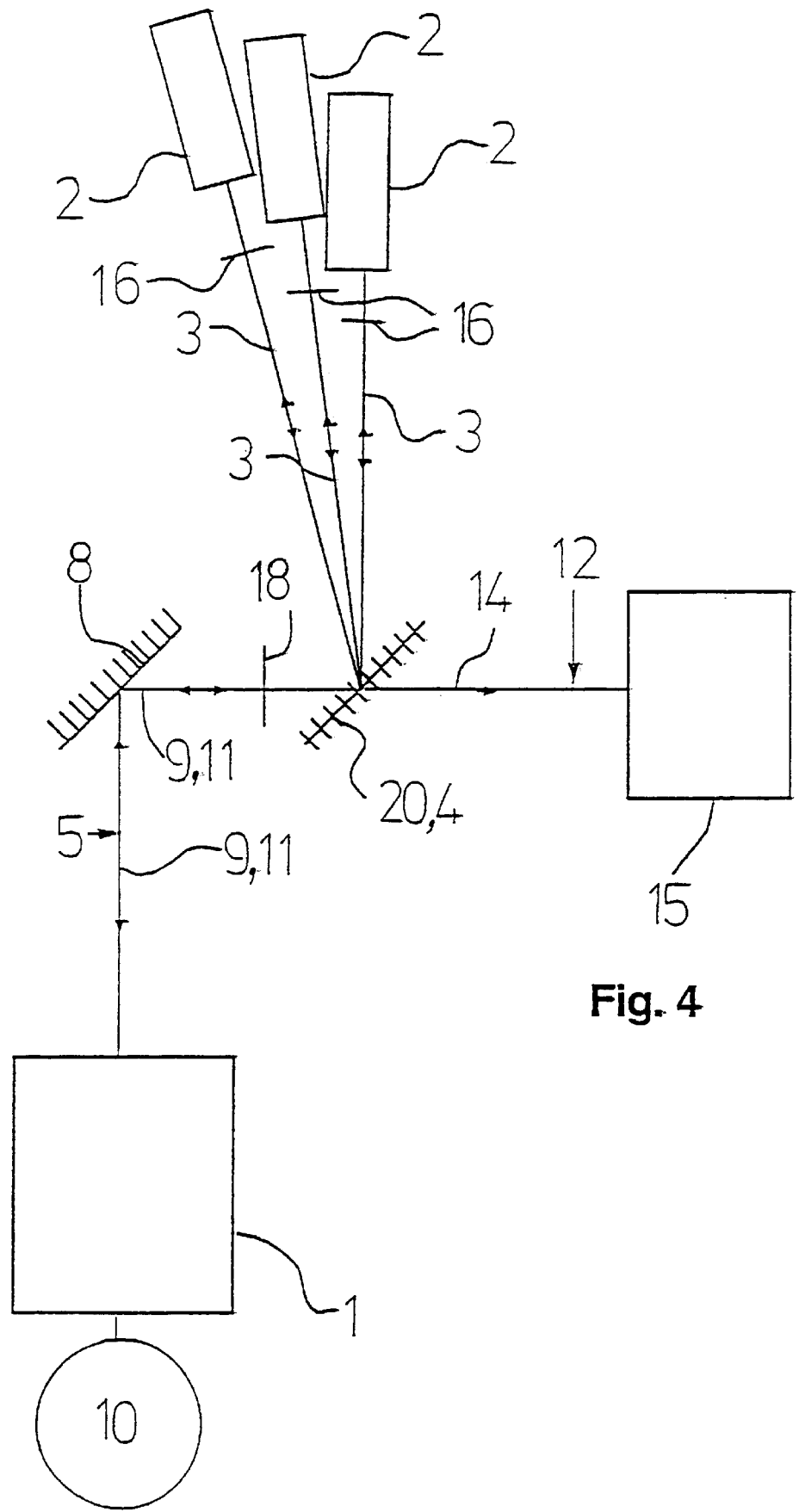
Figure 5:
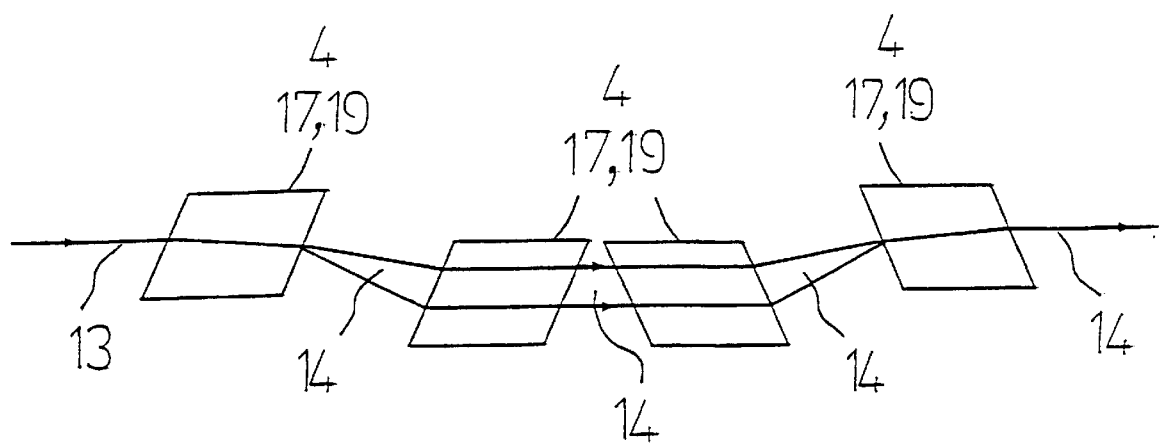
Figure 6:
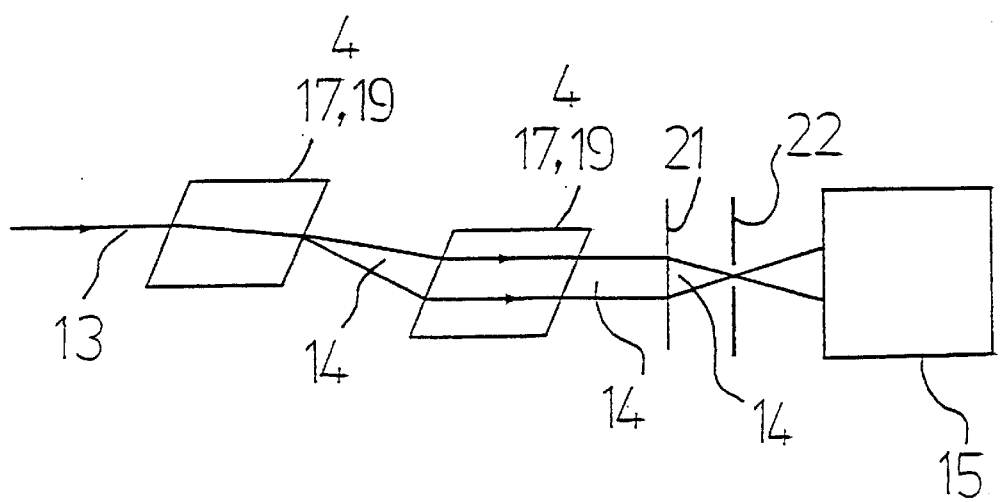
Figure 7:
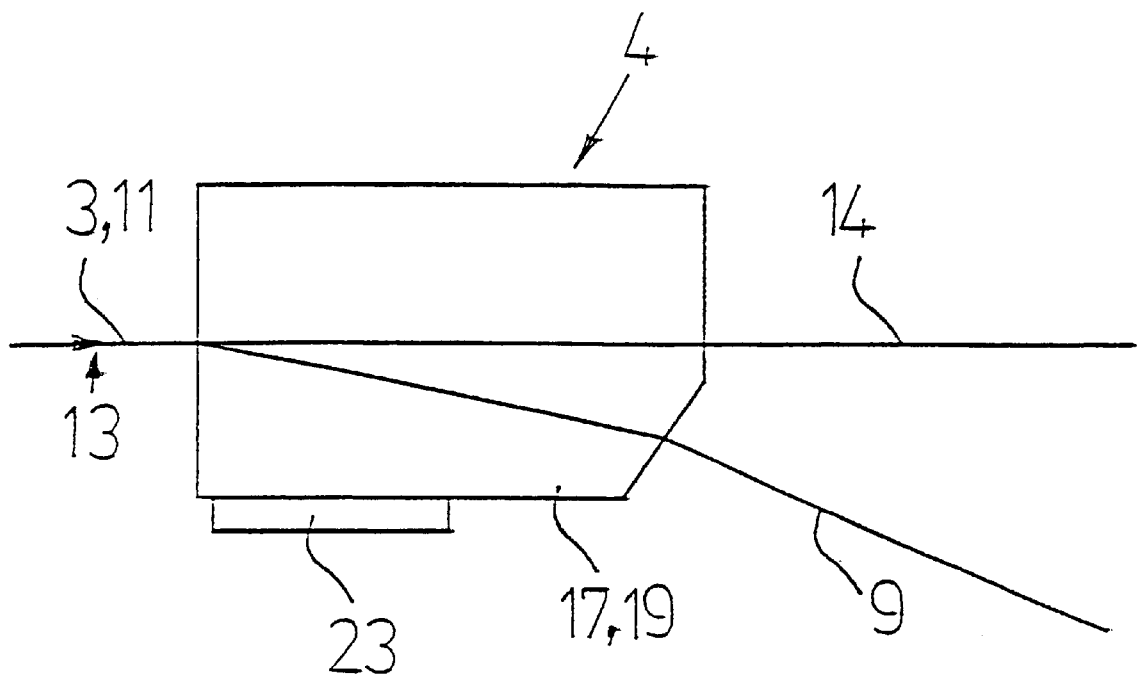
Figure 8:
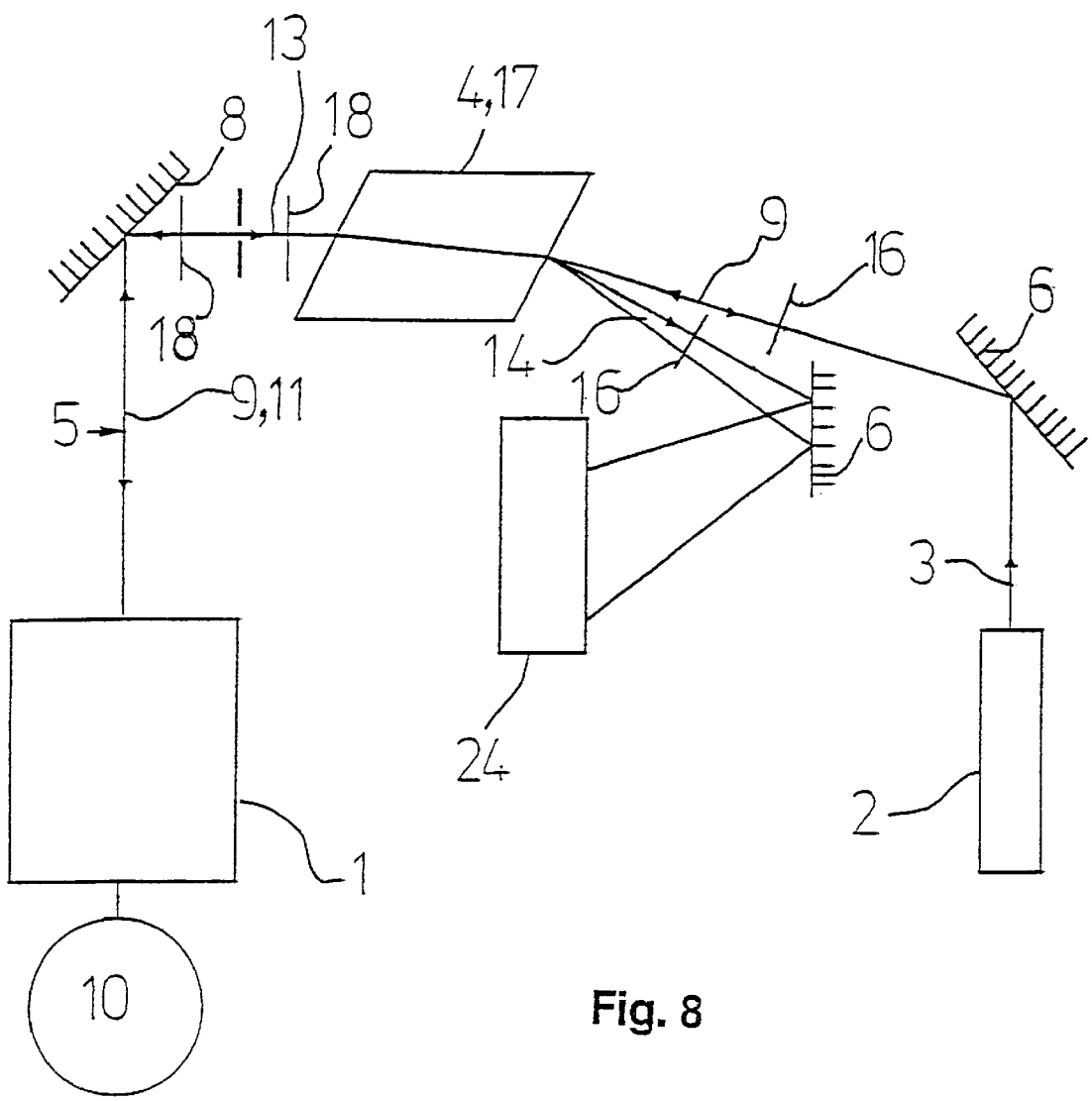
Figure 9:
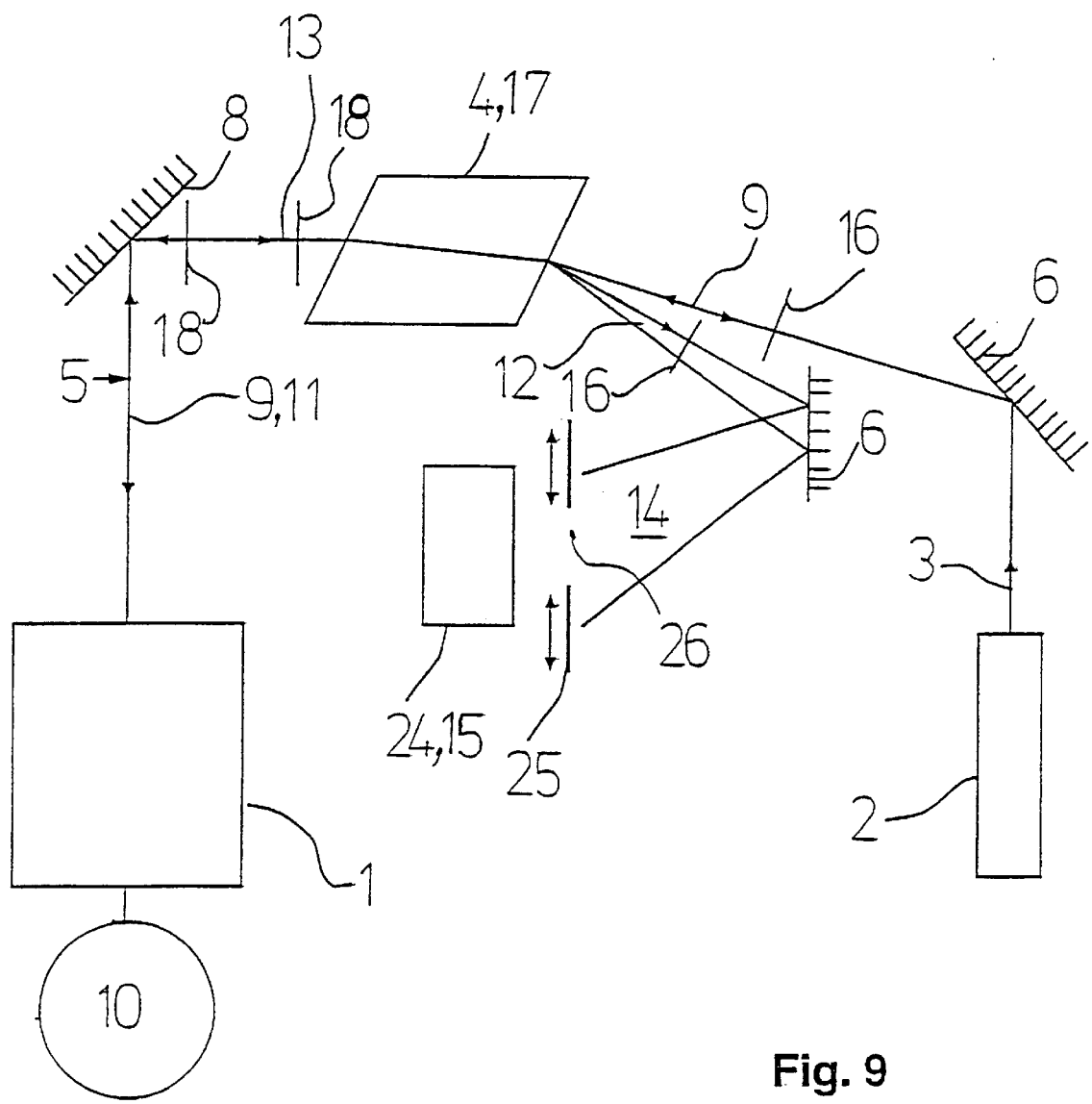

FIG. 2 in a schematic representation, a first embodiment,

FIG. 3 in a schematic representation, a second embodiment of an inventive optical arrangement in the beam path of a confocal laser scanning microscope, wherein three lasers with different excitation wavelengths can be injected there, FIG. 4 in a schematic representation, a third embodiment of an inventive optical arrangement in the beam path of a confocal laser scanning microscope, wherein the injection of three laser light sources is accomplished using a transparent grating, FIG. 5 in schematic representation, enlarged and in a partial view, the illumination beam path and detection beam path, wherein means for converging the beams are connected downstream of the active spectrally selective element, FIG. 6 in schematic representation, enlarged and in a partial view, the illumination beam path and detection beam path, wherein a dispersion correction is made there, FIG. 7 in a schematic representation, the principal mode of operation of an AOD or AOTF, FIG. 8 in a schematic representation, an additional embodiment of an inventive optical arrangement, wherein an additional spectral fanning out is performed there in front of a multi-band detector and FIG. 9 in a schematic representation, the embodiment from FIG. 8, wherein a variable gap is arranged there in the detection beam path.

FIG. 1 documents the prior art and thereby shows a standard optical arrangement in the beam path of a light source suited for fluorescent excitation, here an optical arrangement in the beam path of a confocal laser-scanning microscope. The laser scanner 1 here is represented merely symbolically. In the illustration regarding the prior art, a total of three lasers 2, which inject with their excitation light 3 by way of spectrally selective elements 4 into the illumination beam path 5 of the microscope, are provided as light sources. The spectrally selective elements 4 in concrete terms are a mirror 6 and a color beam splitter 7. In any event the excitation light 3 is injected into the illumination beam path 5 and arrives by way of an additional mirror 8 as excitation light 9 at the laser scanner 1.

The light coming back from the object 10, also represented only symbolically—here it is the excitation light 9 scattered and reflected on the object on the one hand and the fluorescent light 11 sent out from the object 10 on the other hand—arrives by way of the mirror 8 at the spectrally selective element 4, here the color beam splitter 7. From there out the excitation light 9 or the excitation wavelength is extracted from the light 13 coming from object 10 by way of the detection beam path 12 and arrives back at the lasers 2 as returning excitation light 9. The detection light 14 not deflected by the color beam splitter 7 arrives directly at the detector 15.

According to the invention, returning excitation light 3 of various wavelengths can be extracted by the spectrally selective element 4. This is represented in particular in FIG. 4.

Alternatively—in a likewise inventive way—the spectrally selective element 4 can be adjusted to the excitation wavelength to be extracted. This allows the embodiments to be discerned especially well from FIGS. 2, 3 and 8, 9.

With the embodiment shown in FIG. 2, only one laser 2 is provided whose excitation light 3 can have different wavelengths. In any event, the excitation light 3 arrives at an AOTF 17, which works as a spectrally selective element, by way of a mirror 6 and by way of an additional optical element, specifically by way of a lens 16. From there out the excitation light 3 in turn arrives at the laser scanner 1 by way of an additional optical element—in the embodiment selected here, a lens 18—and by way of a mirror 8. Reflected from object 10, the returning light—reflected excitation light 9 and detection light 11—arrives back in the AOTF 17 by way of the mirror 8 and the lens 18 and there is extracted in part corresponding to the connection of the AOTF 17. In concrete terms the detection light or fluorescent light 11 is routed through the detection beam path 12 to the detector 15 (0. order). The returning excitation light 9, by contrast, is routed back through the lens 16 and the mirror 6 to the laser 2 and thus is extracted from the detection beam path 12.

The embodiment shown in FIG. 3 behaves similarly, wherein three lasers 2 inject their excitation light 3 simultaneously into the illumination beam path 5 by way of additional optical elements, in this case lenses 16, through an AOD 19, an additional lens connected downstream 18 and a mirror 8 in the illumination beam path. From there out the excitation light 3 arrives at the laser scanner 1 and at object 10.

The light 13 coming from the object, comprises in the aforesaid embodiment fluorescent light 11 and returning excitation light 9, whereby there the AOD 19 routes the returning fluorescent light as detection light 14 to the detector 15. The returning excitation light 9 is extracted and arrives at the lasers 2 in question by way of lenses 16.

The embodiment shown in FIG. 4 comprises a transparent grating 20 as the spectrally selective element 4, whereby three lasers 2 inject their excitation light 3 into the illumination beam path 5 of the microscope through said transparent grating 20. What is essential here in any event is that the transparent grating 20 extracts the excitation light 9 returning from the object 10 from the detection beam path so that this light arrives back at the lasers 2. The fluorescent light 11 to be detected arrives at the detector 15 by way of the detection beam path 12.

FIG. 5 shows the possibility of a dispersion correction, wherein the light 13 coming back from the object arrives in the AOTF 17 or AOD 19. There the returning detection light 14 is—mandatorily—spectrally fanned out and is made parallel by means of elements connected downstream—AOD/AOTF—and ultimately converges. The spectrally merged detection light 14 goes from there to the detector 15 not shown in FIG. 5.

With the dispersion correction shown in FIG. 6, the light 13 coming from the object is fanned out by means of AOD 17/AOTF 19, whereby the fanned out detection light 14 by means of an additional passive spectrally selective element 4—AOTF 17 or AOD 19—by way of a lens 21 converts with field correction and goes through a detection pinhole 22 or through a detection gap to the detector 15.

According to the illustration in FIG. 7, the spectrally selective element 4 is an AOTF 17 or an AOD 19, said elements comprising a special crystal with dispersion-free 0-order. This crystal or this spectrally selective element is activated by or impinged means of a piezoelectric element 23. FIG. 7 shows especially clearly that the light 13 coming from the object is split up in the AOTF 17 or AOD 19, the detection light 14 passing unhindered through the crystal as dispersion-free light 0-order. The excitation light 9 coming back from the object is by contrast deflected as $1^{st}$ order light and back to the lasers not shown here.

FIG. 8 shows a special detection with employment of the spectral fanning out of the spectrally selective element 4, in concrete terms here an AOTF 17. The light 13 coming from object 10 is spectrally split in the AOTF 17, the detection light 14 arriving at a multi-band detector 24 or spectrometer by way of a lens 16 and a mirror 6. The mirror 6 leads to an extension of the reach so that a fanning out of the returning detection light 14 up to the multiband detector 24 is favored.

The excitation light 9 extracted in the AOTF 17 arrives back to the laser 2 by way of the lens 16 and the mirror 8.

Finally, FIG. 9 shows in a schematic representation the embodiment from FIG. 8, whereby there—as a supplement—a variable gap filter 25 is arranged in the detection beam path in front of the multi-band detector 24. This gap filter 25 is arranged in the detection beam path directly in front of the detector 15 and can be positioned within the detection beam path. Furthermore, the gap 26 of the gap filter 25 is variable so that in this respect a spectral selection of the detection light 14 is also possible.

Regarding additional embodiments of the concept according to the invention that cannot be inferred from the figures, refer—in order to avoid repetition—to the general part of the description and the mode of operation of the concept and the advantageous embodiments described therein.

Reference Number List

1 Laser scanner
2 Laser (light source)
3 Excitation light
4 Spectrally selective element
5 Illumination beam path
6 Mirror
7 Color beam splitter
8 Mirror
9 Excitation and detection light
10 Object
11 Fluorescent light (detection light)
12 Detection beam path
13 Light (coming from the object)
14 Detection light (non-deflected detection light)
15 Detector
16 Lens
17 AOTF
18 Lens
19 AOD
20 transparent grating
21 lens (with field correction)
22 detection pinhole
23 piezoelectric element
24 multi-band detector (spectrometer)
25 gap filter (variable)
26 gap (of 25)

What is claimed is:

1. An optical arrangement in an illumination beam path of at least one light source suitable for fluorescence excitation of an object, said optical arrangement comprising:
    a spectrally selective element positioned in said illumination beam path to introduce an excitation wavelength from said at least one light source into said illumination beam path and to extract said excitation wavelength from light coming from said object along a detection beam path, wherein said spectrally selective element is adjustable to change said excitation wavelength to be extracted.

2. The optical arrangement according to claim 1, wherein said first spectrally selective element is an active component.

3. The optical arrangement according to claim 2, wherein said first spectrally selective element works acousto-optically and/or electro-optically.

4. The optical arrangement according to claim 3, wherein said first spectrally selective element is an acousto-optical deflector (AOD).

5. The optical arrangement according to claim 4, wherein said at least one light source is a plurality of light sources for supplying a plurality of illumination beams of different wavelengths, and said AOD is simultaneously connected with corresponding frequencies so that each of said plurality of illumination beams after passing through said AOD is coaxial with an optical axis of said illumination beam path.

6. The optical arrangement according to claim 3, wherein said first spectrally selective element is an acousto-optical tunable filter (AOTF).

7. The optical arrangement according to claim 6, wherein said at least one light source is a light source that supplies an excitation wavelength selected from a plurality of different excitation wavelengths, and said AOTF is simultaneously connected with a plurality of corresponding frequencies such that said AOTF extracts said selected excitation wavelength.

8. The optical arrangement according to claim 2, wherein said first spectrally selective element is constructed such that a spectral fanning out of detection light coming from said object along said detection beam path is at least largely prevented.

9. The optical arrangement according to claim 1, further comprising at least one additional spectrally selective element positioned in said illumination beam path downstream of said first spectrally selective element for the power-specific regulation of individual wavelengths.

10. The optical arrangement according to claim 9, wherein said additional spectrally selective element is an AOD.

11. The optical arrangement according to claim 9, wherein said additional spectrally selective element is an AOTF.

12. The optical arrangement according to claim 2, wherein said first spectrally selective element includes a drive unit for setting a selected excitation wavelength chosen from said plurality of different excitation wavelengths, said selected excitation wavelength being mandatorily coupled with said drive unit so that only said selected excitation wavelength is introduced into said illumination beam path and only said selected excitation wavelength is extracted from light coming from said object along said detection beam path.

13. The optical arrangement according to claim i, wherein said at least one light source is driven in conjunction with said first spectrally selective element.

14. The optical arrangement according to claim 13, wherein said at least one light source is automatically driven in conjunction with said first spectrally selective element.

15. The optical arrangement according to claim 13, wherein said at least one light source and said first spectrally selective element are driven according to a freely definable specification.

16. The optical arrangement according to claim 1, wherein at least one additional optical element is positioned in either of said illumination beam path or said detection beam path.

17. The optical arrangement according to claim 16, wherein said at least one additional optical element includes an active holographic optical element positioned downstream of said first spectrally selective element and used as a beam scanner.

18. The optical arrangement according to claim 17, wherein said first spectrally selective element and said holographic optical element are combined into one functional component.

19. The optical arrangement according to claim 16, wherein said at least one additional optical element includes a beam adjustment means.

20. The optical arrangement according to claim 19, wherein said beam adjustment means includes a lens.

21. The optical arrangement according to claim 19, wherein said beam adjustment means includes a prism.

22. The optical arrangement according to claim 19, wherein said beam adjustment means includes a diaphragm.

23. The optical arrangement according to claim 22, wherein said diaphragm is a pinhole diaphragm.

24. The optical arrangement according to claim 22, wherein said diaphragm is a slit diaphragm.

25. The optical arrangement according to claim 19, wherein said beam adjustment means includes a filter.

26. The optical arrangement according to claim 19, wherein said filter is a barrier filter.

27. The optical arrangement according to claim 25, wherein said filter is arranged directly in front of said detector.

28. The optical arrangement according to claim 19, wherein said beam adjustment means includes a focusing means.

29. The optical arrangement according to claim 16, wherein said at least one additional optical element includes a means for compensation of the spectral fanning out caused by said first spectrally selective element.

30. The optical arrangement according to claim 29, wherein said means for compensation includes at least one AOTF.

31. The optical arrangement according to claim 30, wherein said at least one AOTF is used as a passive element.

32. The optical arrangement according to claim 16, wherein said at least one additional optical element includes a color beam splitter in said detection beam path for further spectral dissection.

33. The optical arrangement according to claim 1, further comprising reflection means arranged in said detection beam path for extending optical path length to said detector to allow angle expansion of the fanning out of a detection beam.

34. The optical arrangement according to claim 1, further comprising a gap filter arranged in said detection beam path in front of said detector.

35. The optical arrangement according to claim 34, wherein said gap filter is positionable relative to said detection beam path.

36. The optical arrangement according to claim 34, wherein a gap of said gap filter is variable.

37. The optical arrangement according to claim 1, wherein said detector is a spectrometer for detection of the spectral fanning out of a detection beam.

38. The optical arrangement according to claim 37, wherein said spectrometer is a multi-band detector.

39. The optical arrangement according to claim 1, wherein said extracted excitation wavelength is deflected from said detection beam path in a direction of its light source of origin.

40. The optical arrangement according to claim 1, wherein said at least one light source includes a white light source.

41. The optical arrangement according to claim 1, wherein said at least one light source includes an optically parameterized oscillator (OPO).

42. The optical arrangement according to claim 1, wherein said at least one light source includes an electron beam collision light source.

43. The optical arrangement according to claim 1, wherein said at least one light source includes a laser light source.

44. The optical arrangement according to claim 43, wherein said laser light source is variable through variability of the wavelength.

45. The optical arrangement according to claim 43, wherein said laser light source comprises a laser with a plurality of different wavelengths.

46. The optical arrangement according to claim 1, wherein said at least one light source includes a plurality of lasers having different wavelengths.

47. The optical arrangement according to claim 43, wherein said laser is a dye laser.

48. The optical arrangement according to claim 46, wherein said plurality of lasers includes at least one dye laser.

* * * * *

UNITED STATES PATENT AND TRADEMARK OFFICE
CERTIFICATE OF CORRECTION

PATENT NO. : 6,510,001 B1
DATED : January 21, 2003
INVENTOR(S) : Johann Engelhardt, Joachim Bradl and Heinrich Ulrich It is certified that error appears in the above-identified patent and that said Letters Patent is hereby corrected as shown below:

Column 9,
Line 28, cancel "a" and insert -- said --.
Line 29, cancel "said" and insert -- a --.
Line 36, cancel "i" and insert -- 1 --.

Column 10,
Line 7, cancel "19" and insert -- 25 --.

Signed and Sealed this

Twenty-second Day of July, 2003

JAMES E. ROGAN
*Director of the United States Patent and Trademark Office*